Sept. 13, 1966  C. J. KOESTER ET AL  3,273,072
LASER AMPLIFIER WITH VARIABLE GAIN CONTROL
Filed Jan. 18, 1965  2 Sheets-Sheet 1

INVENTORS
CHARLES J. KOESTER
NOBLE S. WILLIAMS
BY
ATTORNEY

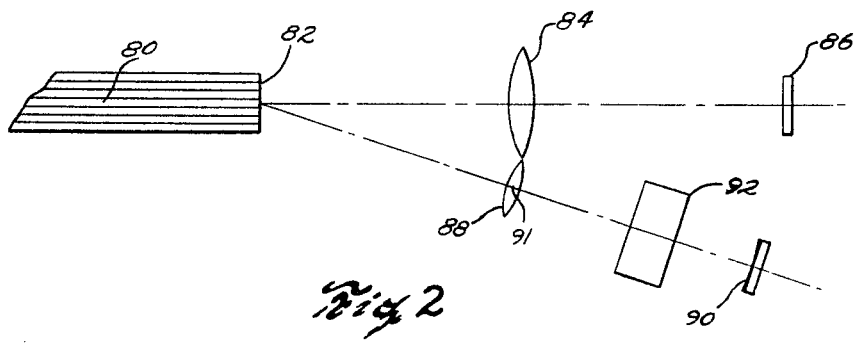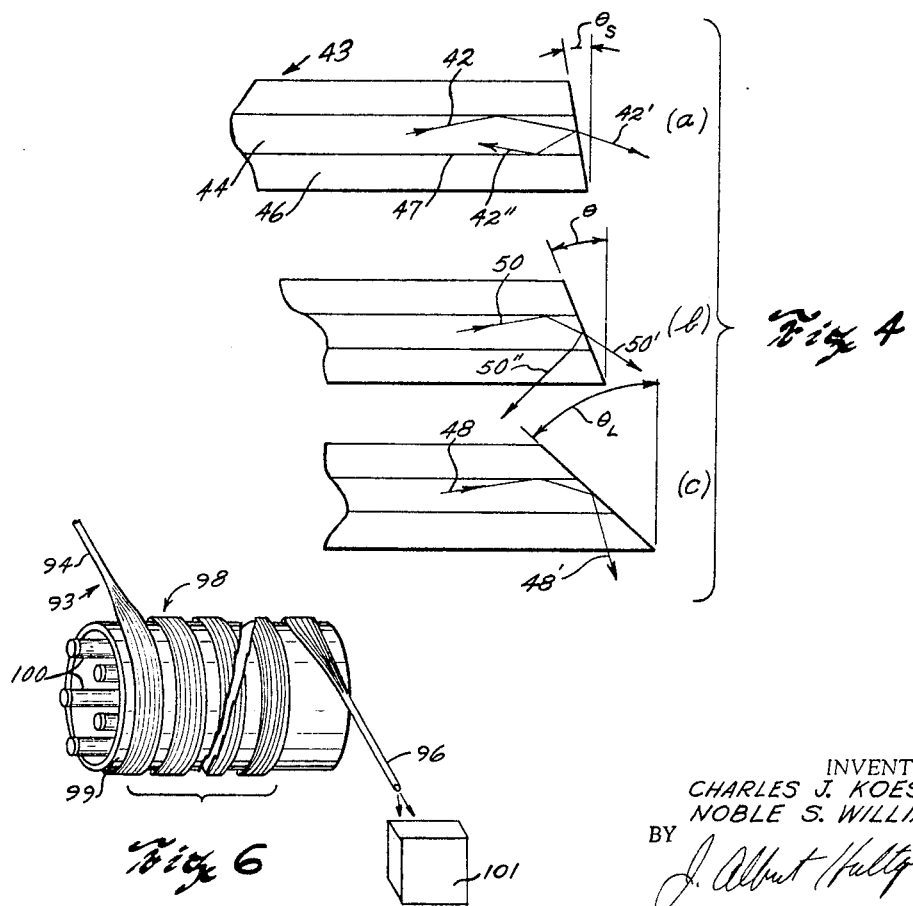

United States Patent Office 3,273,072
Patented Sept. 13, 1966

3,273,072
LASER AMPLIFIER WITH VARIABLE GAIN CONTROL
Charles J. Koester, South Woodstock, Conn., and Noble S. Williams, Sturbridge, Mass., assignors to American Optical Company, Southbridge, Mass., a voluntary association of Massachusetts
Filed Jan. 18, 1965, Ser. No. 426,030
9 Claims. (Cl. 330—4.3)

This invention relates to laser amplifier constructions of the type employing thin elongated laser components adapted to be optically pumped by optical energy being directed into the laser component through sidewall portions thereof and arranged to increase the strength of optical signals being transmitted longitudinally from end-to-end therethrough.

More particularly, the invention relates to laser amplifier constructions employing thin elongated laser amplifier components having means operatively associated therewith for controlling the amount of gain in amplification to be provided to the optical signals being amplified thereby. Also, the construction is such that said control means may be readily adjustable throughout a relatively wide range to effect changes in the amount of amplification being provided said signals.

It is known that optical signals of a wavelength corresponding to the emission wavelength of a laser component and travelling within an elongated optical communication line can be directed therefrom into one end of such an elongated laser component so as to be amplified while passing therethrough by pumping optical energy being applied through sidewall portions of the component. However, means for conveniently controlling or regulating the amount of gain which can be obtained and maintained at a substantially constant value by such a laser amplifier construction have not heretofore been available, and when it is attempted, for instance, to regulate the amount of gain being provided by regulating the amount of light being supplied to the laser amplifier by the pumping light source, the results have not been at all satisfactory. Furthermore, it should be noted that under some laser amplifier operating conditions, the strength of incoming optical signals may tend to reduce the inversion of population within the laser material and thereby alter the gain conditions; such also making a control as to the gain being provided by such a laser amplifier desirable.

It has now been found possible by following the teachings of the present invention, and wherein very thin elongated fiber optical laser components of proper predetermined optical and physical characteristics are used in an improved laser amplifier construction, to regulate and variably control the amount of gain in amplification being provided thereby, and even possible to have the selected amount of gain being provided by the amplifier components remain relatively constant notwithstanding variations in strength of incoming signals to be amplified.

Such gain control is made possible by use of means constructed and arranged to operate in conjunction with thin elongated fiber optical laser amplifier components by arranging said control means so as to control the fraction of the energy which is reflected at one end of the component and thereby fed back into the component. This control of feedback energy effects an overall control as to the gain response characteristics of the laser amplifier construction. Also the improvements in laser amplifier gain control can be applied to constructions employing bundles of such laser amplifier components intended for transmitting and amplifying optical images.

It is, accordingly, a principal object of the present invention to provide a fiber optical laser amplifier construction comprising one or more relatively thin elongated fiber optical components each formed at least in part of an active laser material, and means constructed and arranged to function therewith in such a way as to cause a portion of the optical energy emitted therefrom to be collected and directed back into the same component in such a manner as to effect an inversion of population within the laser material and, accordingly, function as means for controlling or regulating the gain characteristics of the laser amplifier component or components as the case may be.

It is also an object of the invention to provide for such a fiber optical laser amplifier construction readily adjustable means whereby the amount of optical energy being collected and directed back into the laser component or components may be varied as desired and thereby provide a control as to the amount of gain or inversion to be effected thereby.

Other objects and advantages of the invention will become apparent from the detailed description which follows when taken in conjunction with the accompanying drawings in which:

FIG. 2 is a partial side elevation view of a modified form of laser amplifier construction embodying the present invention;

FIG. 4 shows three related sketches for use in explaining the invention;

FIG. 6 is a perspective view of another modified form of laser amplifier construction.

Figure 1:
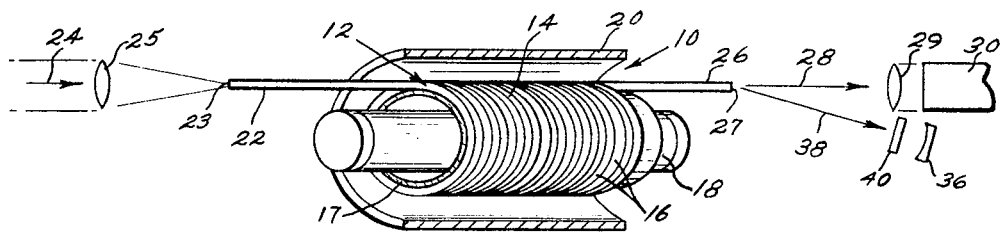
FIG. 1 is a side elevational view, partly in section, of a laser amplifier construction embodying the present invention.

Referring to the drawings in detail, it will be seen that numeral 10 in FIG. 1 indicates generally a laser amplifier construction which includes a thin elongated fiber optical laser amplifier component 12 and the central portion 14 of this component is formed into a helically shaped coil comprising a considerable number of similar connected convolutes 16 disposed in fairly close but spaced side-by-side relation to each other. These convolutes may be supported by a transparent cylinder 17 (which for clarity has been shown broken away at one end) and are in encircling concentric relation to a high intensity flash tube, or the like, 18, and of course, the flash tube will be of a suitable known kind so as to be capable of efficiently providing pumping optical energy of the proper wavelengths required for pumping the particular kind of laser material being employed. One well-known kind of laser material suitable for use herein is trivalent neodymium in barium crown glass as the host material. In order to efficiently and uniformly irradiate substantially all parts of these convolutes, the construction also comprises an elongated cylindrically-shaped reflector 20 arranged in concentric encircling relation to the helically coiled portion 14.

An entrance end of the laser component 12 is indicated at 22 and is provided with an optically finished flat entrance end surface 23 for receiving an incoming optical signal, such as that suggested by arrow 24 and the light rays constituting this signal are focused by lens 25 upon the end of the component. Likewise, the opposite, exit end of the component 12 is indicated at 26 and is optically finished with a similar flat exit end surface 27 for allowing the optical signal, suggested by arrow 28 and after being amplified, to pass outwardly therefrom. A lens 29 is positioned so as to collect the light rays of this signal and direct same toward suitable detecting means or the like 30.

As will be readily appreciated from the disclosure of recently issued U.S. Patent No. 3,157,726, when a thin elongated fiber optical element is of proper small cross-sectional size in relation to its refractive index, in relation to the refractive index, of its surround and in relation to the wavelength of the optical energy to be guided thereby, it is possible to propagate therethrough optical energy of only a few predetermined discrete lower order optical wave guide modes, and some of these lower order mode patterns have been disclosed in the drawings of said patent.

It should be noted from said patent that while some of the energy being emitted from the end of such a thin elongated optical fiber will be radiated in axial or very nearly axial direction, other parts will be directed outwardly from the end of the optical fiber at larger angles relative to the axis thereof. Also note that the larger part of the energy of such radiation is in the more nearly axial part of the radiation.

It has now been found that by the use of spherically curved mirror means suitably disposed in relation to the exit end of such a thin elongated fiber optical laser amplifier component so as to intercept some or even a large part of such off-axis optical energy and direct this energy back into the fiber optical component through the same end wall surface thereof, and this energy, which may be termed feedback, F, may be used to control the amount of inversion or gain, G, which may be attained by the laser amplifier component.

Accordingly, there is shown in FIG. 1 adjacent but to one side of the detecting means 30 a concavely curved spherical mirror 36 for collecting at least a part of the off-axis radiation being emitted from the exit end surface 27 of the component 12, as indicated by arrow 38. This mirror will be spaced from the exit surface 27 a distance substantially equal to the radius of curvature of the mirror and will be so positioned as to tend to direct and focus light received from the exit end surface of the component back at the exit surface. Thus this energy will reenter the component as feedback energy and tend to affect the inversion of populative condition within the laser material thereof.

In order to effect a control as to the amount of energy being returned by the mirror 36 to the exit surface 27, it is possible, as suggested by unit 40 in FIG. 1, to employ in the path of this energy readily controllable light modifying means such as a Kerr cell, or a Faraday cell, or a pair controllable graduated density light filters, or a pair of adjustable polarizers. Thus, the amount of light being returned as feedback to the laser amplifier component 12 may be varied as desired and will, of course, in turn effect a control as to the gain, G, to be provided by the amplifier component.

If the feedback, F, is defined as the fraction of the light trying to leave the ends of the fiber optical laser component and which is, in effect, returned thereto by both the external mirror and the internal reflections at the end walls, the gain will be limited thusly if both ends of the component are identical:

$$G = \frac{1}{F} \quad (1)$$

However, if it is considered that the entrance end has a reflectance, R, the gain will be:

$$G = \sqrt{\frac{1}{FR}} \quad (2)$$

Figure 5:
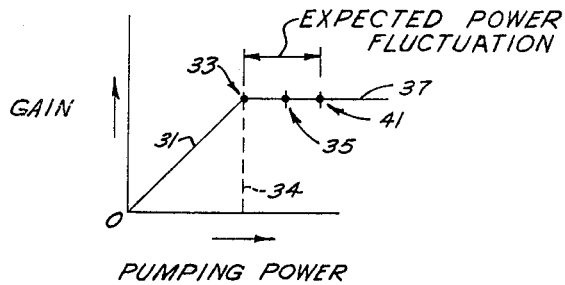
FIG. 5 is a graph showing gain plotted against pumping power.

When the laser structure of FIG. 1, for example, is pumped by the light source, whether same be flash tube means or a continuous light source, the inversion of population will build up in the component as a function of the pumping power, as suggested by diagonal line 31 in FIGURE 5, until the threshold inversion indicated at point 33 on dotted line 34 is reached, this dotted line indicating the pump power at threshold. This threshold is that condition for which the gain per pass is just equal to that given by expression (2) above. The inversion will not increase significantly above the threshold value and point 35 indicates the operating point on the horizontal extension 37 of line 31.

The location of point 35 on line 37 can be varied somewhat. If the pumping rate should increase, the additional power, which would be indicated by the change in the distance between points 33 and 41, will go into increased stimulated emission output. That is to say, the stimulated emission in the laser material will increase to keep the inversion at or near the threshold value. If the oscillation includes a series of short spikes, the inversion will increase slightly between the spikes and decrease during each spike. A non-spiking type of oscillation is preferred. The operating point for the amplifier can, in principle, be at any convenient power level. Then a moderate increase or decrease in pumping power will not cause a change in gain. For efficiency, however, it would be preferable to keep the pumping power as low as practical, and thus the operating point 35 would be located just above the threshold pumping power value.

While both flat end surfaces of the laser amplifier component in FIG. 1 have been indicated as being finished so as to be at right angles to the longitudinal axis of the component at the adjacent ends thereof, it may be preferred, for reasons presently to be described, to have each flat end surface disposed at a controlled angle relative to the axis of the component so as to fall between predetermined upper and lower limiting angular values. When such is the case, it is possible to obtain a much greater degree of light amplification from the laser amplifier component than would be possible otherwise.

Such angularity on the end surfaces of a laser amplifier component has been more fully disclosed in my copending application Serial No. 267,711, filed March 25, 1963. However, briefly stated, a high gain in amplification is possible when the angularity or slope of each flat end surface is controlled so as to fall between the hereindescribed upper and lower limits. The lower limit may be considered to be the smallest angle at which no light travelling longitudinally within the component and impinging upon the end surface thereof will be so internally reflected by this end surface as to be directed back along the length of the component. On the other hand, the upper limit may be considered to be the largest angle of slope for the end wall which will allow light travelling within the component to leave the component without being totally internally reflected at the end wall.

This relationship may be more readily appreciated by reference to FIG. 4 wherein parts (a), (b) and (c) show, by way of examples, three different angles for the sloping end wall conditions for a component. Inspection of part (a) shows that the light ray 42 travelling within the clad laser component 43, (which comprises a core portion 44 of active laser material and a transparent cladding 46 of lower refractive index material) will, after impinging on the sloping flat exit end surface of the component, be in part transmitted therethrough as indicated by ray 42' and in part reflected back into the core as indicated by ray 42". However, it should be appreciated that here the angle of slope $\theta_s$ is not good since it has been so chosen that this reflected ray 42" will be subsequently totally internally reflected at the side wall interface 47 and will thereafter tend to travel down the core and decrease the amplification factor of the component. Thus angle $\theta_s$ is too small.

Inspection of part (c) in FIG. 4, on the other hand, shows a considerably larger angle $\theta_L$ for the end wall. In this case the light ray 48 travelling within the component will be totally internally reflected at the end wall surface, as suggested by ray 48' and will be lost out the side of the component. Thus the angle $\theta_L$ is too large. In part (b) of FIG. 4 is shown a sloping end wall surface having an angle θ which is of a better choice since not only will some of the light of ray 50 travelling within the component be allowed to pass out of the component as indicated by ray 50' but allow that part of the light which is internally reflected at the end wall surface will be directed out of the component through the side wall thereof, as indicated by ray 50" rather than being allowed to travel back down the core.

Figure 3:
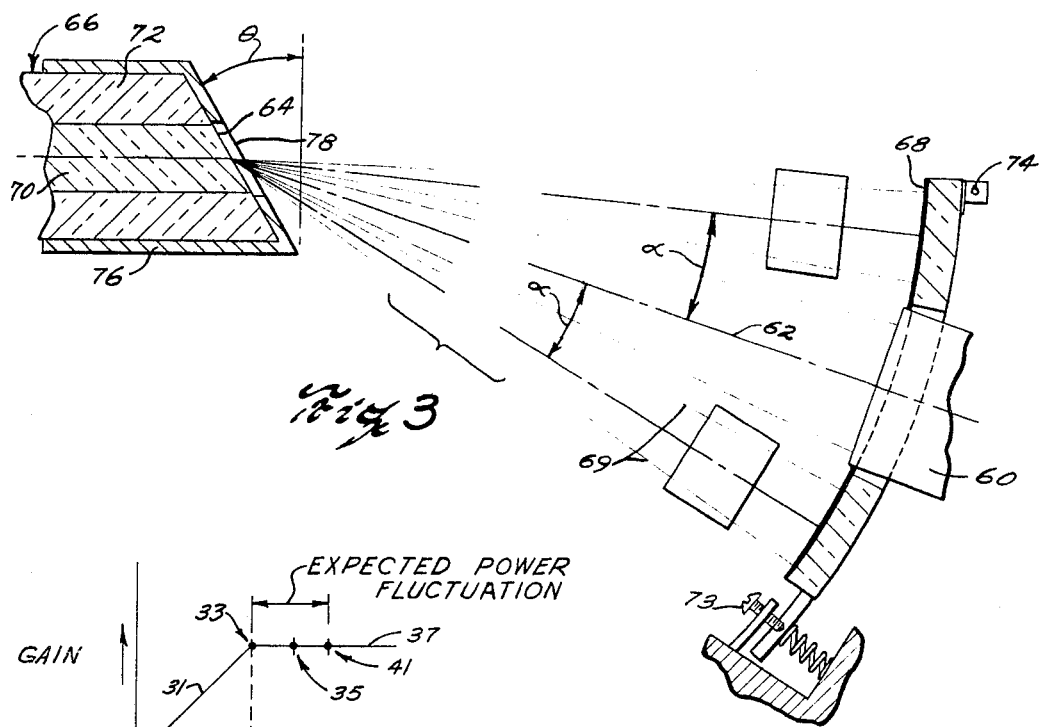
FIG. 3 is an enlarged fragmentary and partly broken-away sectional view of an end portion of a laser amplifier construction showing a modified form of gain control therefor.

It is possible, as indicated at 60 in FIG. 3, to position suitable light detecting means, such as a photomultiplier or the like, so as to receive the major portion of the amplified optical signal being emitted generally along a predetermined optical axis 62 extending from the sloped exit end 64 of a clad laser amplifier component 66 and also possible to position a concave spherical mirror 68 so as to intercept a part at least or even nearly all of the off-axis rays 69 being emitted at an off-axis angle α therefrom and to direct this energy back to the end surface 64 of the component.

In FIG. 3, wherein the structure comprises only a single component 66 having a core 70 and a lower index cladding 72, it is possible to use one large centrally apertured spherical mirror to intercept substantially all of the off-axis lower order mode radiation and to focus same back at the exit surface of the core. In this figure adjustable means is indicated at 73 for moving one edge of the mirror slightly fore and aft while the opposite edge is pivotally mounted, as at 74. In this way it is possible to shift the image of the core end formed by the mirror at the plane of the core end across the end surface of the core 70 and thereby variably control the amount of feedback energy being supplied the component.

While a cladding for the laser component 70 is not imperative, nevertheless, it is at times desirable to use such a cladding where greater strength, or protection from dirt or dust or the like is needed. In such instances, it may also be desirable to prevent undesired stray light from entering the end of the cladding material, particularly when the mirror 68 is intentionally adjusted to a slightly off-axis condition. For this reason an opaque cap is shown at 76 and provided with a central opening 78 therein.

In FIG. 2 is shown at 80 the exit end portion only of a thin elongated laser amplifier construction much like that of FIG. 1 but modified to include, instead of a single thin elongated laser amplifier component, a bundle of such components in closely bunched side-by-side array. Of course each component thereof will be of the laser core and lower index cladding type, and all will be bunched together in generally parallel relation for the purpose of transmitting an optical image which has been amplified by pumping optical energy being applied at the helically coiled central portion (not shown) but as suggested by FIG. 1. Thus, the flat exit end surface 82 of the bundle 80 will present a large array of closely spaced small fiber optical laser amplifier components each capable of emitting an amplified optical signal and which collectively will constitute an amplified optical image.

A lens 84 is shown aligned with this bundle and arranged to focus the light received from each laser core upon suitable detecting means, such as a phosphor viewing screen or the like 86. In order to effect a feedback of the off-axis energy from each of the many fiber optical components of such a laser amplifier bundle, and thus effect a control as to the gain of each, a lens, such as that indicated at 88, may be used together with a concave spherical mirror 90 aligned therewith. The lens 88 should be of such optical characteristics as to form an image of the end of the bundle 80 substantially at the surface of concave spherical mirror 90 and the mirror should return all of this light back to the individual cores initially contributing same.

In order to accomplish this the lens 88 as shown is arranged to operate at a one-to-one conjugate ratio and the concave mirror 90 aligned therewith has a radius of curvature equal to the distance from lens 88 to the mirror and is located so as to have its center of curvature 91 at lens 88 as indicated. Thus even though the lens 88 would tend to reverse the image being formed at the surface of the mirror 90 aligned therewith, this light from each core will nevertheless be returned by the mirror and the lens to its original location at exit surface 82. As indicated at 92 a Kerr cell, or the like, may be used to control this off-axis radiation.

In FIG. 6 a laser amplifier construction which includes a bundle 93 comprising a plurality of fiber laser components is shown but this bundle differs from that suggested by FIG. 2 in that the individual fibers at each end of the bundle are secured together so that both ends 94 and 96 have the same fixed geometric arrangements. However, the fiber components throughout the major part of the length of the bundle intermediate the opposite ends thereof are free from one another and are carefully arranged, when the bundle is wound as a series of convolutes about a transparent cylinder 99, so as to spread out and form a single layer of fibers adjacent the pumping light source. In this way, each fiber of the bundle will be pumped by substantially the same amount of optical energy when irradiated by the light source means 100. Unit 101, aligned with the exit end 96 of the bundle, will include light-collecting, reflecting and controlling means substantially like that indicated at 84, 86, 88, 90 and 92 in FIG. 2.

I claim:

1. A laser amplifier construction comprising a thin elongated component formed of a transparent material of a predetermined refractive index and including an active laser ingredient therein, said component having an optically finished flat end surface formed on the entrance end thereof for admitting into said component optical signals to be amplified, said component having a second optically finished flat end surface formed on the opposite exit end thereof for allowing said optical signal after amplification to pass outwardly therethrough, optical pumping means positioned adjacent an extended intermediate portion of said laser component for producing an inversion in population therein and a gain in amplification in optical signals passing therethrough, signal detecting means disposed substantially in axially aligned spaced relation to the exit end of said component so as to receive optical energy and including said amplified signals, and light-collecting and re-directing means disposed in spaced relation to the exit end of said component and in such offset relation to an optical axis extending between said exit end and said detecting means as to intercept off-axis optical energy being emitted from said exit end during said signal amplification, said light-collecting and re-directing means including concavely curved mirror means so angularly positioned relative to said exit end as to direct at least a part of the optical energy received thereby back into said component through said exit surface for effecting a control as to the gain in the optical signal amplification being provided by said component.

2. A laser amplifier construction comprising a thin elongated component formed of a transparent material of a predetermined refractive index and including an active laser ingredient therein, said component having an optically finished flat end surface formed on the entrance end thereof for admitting into said component optical signals to be amplified, said component having a second optically finished flat end surface formed on the opposite exit end thereof for allowing said optical signal after amplification to pass outwardly therethrough, optical pumping means positioned adjacent an extended intermediate portion of said laser component for producing an inversion in population therein and a gain in amplification in optical signals passing therethrough, signal detecting means disposed substantially in axially aligned spaced relation to the exit end of said component so as to receive optical energy and including said amplified signals, light-collecting and re-directing means disposed in spaced relation to the exit end of said component and in such offset relation to an optical axis extending between said exit end and said detecting means as to intercept off-axis optical energy being emitted from said exit end during said signal amplification, said light-collecting and re-directing means including concavely curved mirror means so angularly positioned relative to said exit end as to direct at least a part of the optical energy received thereby back toward said component and controllable means in the path of said off-axis optical energy between said exit end surface and said mirror means for regulating the amount of energy being directed back toward said component so as to re-enter said component through said exit surface thereof for effecting a gain in the optical signal amplification being provided by said component.

3. A laser amplifier construction comprising a thin elongated component formed of a transparent material of a predetermined refractive index and including an active laser ingredient therein, said component having an optically finished flat end surface formed on the entrance end thereof for admitting into said component optical signals to be amplified, said component having a second optically finished flat end surface formed on the opposite exit end thereof for allowing said optical signal after amplification to pass outwardly therethrough, optical pumping means positioned adjacent an extended intermediate portion of said laser component for producing an inversion in population therein and a gain in amplification in optical signals passing therethrough, signal detecting means disposed substantially in axially aligned spaced relation to the exit end of said component so as to receive optical energy including said amplified signals, and light-collecting and re-directing means disposed in spaced relation to the exit end of said component and in such offset relation to an optical axis extending between said exit end and said detecting means as to intercept off-axis optical energy being emitted from said exit end during said signal amplification, said light-collecting and re-directing means including concavely curved mirror means so angularly positioned relative to said exit end as to direct at least a part of the optical energy received thereby back into said component through said exit surface for effecting a control as to the gain in the optical signal amplification being provided by said component, the flat exit end surface of said component being disposed at such a predetermined angle relative to a transverse plane therethrough as to allow optical energy travelling longitudinally within said component to escape outwardly through said exit end surface but not at such an angle as to allow any of such energy within said component and which might be internally reflected at said exit end surface to be directed back into said component at such an angle as to be totally internally reflected at sidewall surfaces thereof.

4. A laser amplifier construction comprising a thin elongated component formed of a transparent material of a predetermined refractive index and including an active laser ingredient therein, said component having an optically finished flat end surface formed on the entrance end thereof for admitting into said component optical signals to be amplified, said component having a second optically finished flat end surface formed on the opposite exit end thereof for allowing said optical signal after amplification to pass outwardly therethrough, optical pumping means positioned adjacent an extended intermediate portion of said laser component for producing an inversion in population therein and a gain in amplification in optical signals passing therethrough, signal detecting means disposed substantially in axially aligned spaced relation to the exit end of said component so as to receive optical energy including said amplified signals, light-collecting and re-directing means disposed in spaced relation to the exit end of said component and in such offset relation to an optical axis extending between said exit end and said detecting means as to intercept off-axis optical energy being emitted from said exit end during said signal amplification, said light-collecting and re-directing means including concavely curved mirror means so angularly positioned relative to said exit end as to direct at least a part of the optical energy received thereby back into said component through said exit surface for effecting a control as to the gain in the optical signal amplification being provided by said component, said concavely curved mirror means being angularly adjustable so as to vary the amount of optical energy being directed into said component.

5. A laser amplifier construction comprising a thin elongated component formed of a transparent material of a predetermined refractive index and including an active laser ingredient therein, said component having an optically finished flat end surface formed on the entrance end thereof for admitting into said component optical signals to be amplified, said component having a second optically finished flat end surface formed on the opposite exit end thereof for allowing said optical signal after amplification to pass outwardly therethrough, optical pumping means positioned adjacent an extended intermediate portion of said laser component for producing an inversion in population therein and a gain in amplification in optical signals passing therethrough, signal detecting means disposed substantially in axially aligned spaced relation to the exit end of said component so as to receive optical energy including said amplified signals, and light-collecting and re-directing means disposed in spaced relation to the exit end of said component and in such offset relation to an optical axis extending between said exit end and said detecting means as to intercept off-axis optical energy being emitted from said exit end during said signal amplification, said light-collecting and re-directing means including concavely curved mirror means so angularly positioned relative to said exit end as to direct at least a part of the optical energy received thereby back into said component, and controllable means in the path of said off-axis optical energy between said exit end surface and said mirror means for regulating the amount of energy being directed back toward said component so as to enter said component through said exit surface for effecting a control as to the gain in the optical signal amplification being provided by said component, the flat exit end surface of said component being disposed at such a predetermined angle relative to a transverse plane therethrough as to allow optical energy travelling longitudinally within said component to escape outwardly through said exit end surface but not at such an angle as to allow any of such energy within said component and which might be internally reflected at said exit end surface to be directed back into said component at such an angle as to be totally internally reflected at sidewall surfaces thereof.

6. A laser amplifier construction comprising a plurality of thin elongated laser components disposed in generally parallel relation to each other throughout the major portions of their lengths and having their opposite end portions in like geometric arrangements so as to form an optical image transfer bundle, each component of said bundle having a core formed of a transparent material of a predetermined refractive index and including an active laser ingredient therein and having a cladding of transparent material of lower refractive index in surrounding relation thereto, said bundle of laser components having an optically finished flat end surface formed on the entrance end thereof for admitting into said bundle an optical image to be amplified, said bundle having a second optically finished flat end surface formed on the opposite exit end thereof for allowing said optical image after amplification to pass outwardly therethrough, optical pumping means positioned adjacent an extended intermediate portion of said laser bundle for producing an inversion in population in the laser components thereof and a gain in amplification in the optical image passing therethrough, detecting means disposed in axially aligned spaced relation to the exit end of said bundle so as to receive optical energy including said amplified signals from each of said components, and light-collecting and re-directing means disposed in spaced relation to the exit end of said bundle and in such offset relation to an optical axis extending between said exit end and said detecting means as to intercept off-axis optical energy being emitted from said exit end of each component of said bundle during amplification of said image, said light-collecting and directing means including concavely curved mirror means so angularly positioned relative to said exit end as to direct optical energy received from each of said components back into the respective components through said exit end surface for effecting a control as to the gain in the amplification being provided by said bundle.

7. A laser amplifier construction comprising a plurality of thin elongated laser components disposed in generally parallel relation to each other throughout the major portions of their lengths and having their opposite end portions in like geometric arrangements so as to form an optical image transfer bundle, each component of said bundle having a core formed of a transparent material of a predetermined refractive index and including an active laser ingredient therein and having a cladding of transparent material of a predetermined refractive index in surrounding relation thereto, said bundle of laser components having an optically finished flat end surface formed on the entrance end thereof for admitting into said bundle an optical image to be amplified, said bundle having a second optically finished flat end surface formed on the opposite exit end thereof for allowing said optical image after amplification to pass outwardly therethrough, optical pumping means positioned adjacent an extended intermediate portion of said laser bundle for producing an inversion in population in the laser components thereof and a gain in amplification in the optical image passing therethrough, detecting means disposed in axially aligned spaced relation to the exit end of said bundle so as to receive optical energy including said amplified signals from each of said components, and light-collecting and re-directing means disposed in spaced relation to the exit end of said bundle and in such offset relation to an optical axis extending between said exit end and said detecting means as to intercept off-axis optical energy being emitted from said exit end of each component of said bundle during amplification of said image, said light-collecting and directing means including concavely curved mirror means so angularly positioned relative to said exit end as to direct optical energy received from each of said components back into the respective components, and controllable means in the path of said off-axis optical energy between said exit end surface and said mirror means for regulating the amount of energy being directed back toward the respective components so as to re-enter said components through said exit end surface for effecting a control as to the gain in the amplification being provided by said bundle.

8. A laser amplifier construction as defined in claim 6 wherein the extended intermediate portions of the laser components are disposed in side-by-side relation to one another so as to form a layer having all parts thereof substantially similarly exposed to said optical pumping means.

9. A laser amplifier construction as defined in claim 6 wherein said bundle of laser components has an extended intermediate portion arranged in a helically shaped coil about said optical pumping means, and the individual components of said bundle at said intermediate portion are disposed in side-by-side relation to one another so as to form a layer having all parts thereof substantially similarly exposed to said optical pumping means.

No references cited.

ROY LAKE, *Primary Examiner.*

D. R. HOSTETTER, *Assistant Examiner.*